US 9,946,498 B2

(12) United States Patent
Shirai

(10) Patent No.: US 9,946,498 B2
(45) Date of Patent: Apr. 17, 2018

(54) INFORMATION PROCESSING APPARATUS AND CONTROL METHOD BY REQUEST PROCESSING MODULE OPERATING ON INFORMATION PROCESSING APPARATUS

(71) Applicant: CANON KABUSHIKI KAISHA, Tokyo (JP)

(72) Inventor: Kenichi Shirai, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 15/175,518

(22) Filed: Jun. 7, 2016

(65) Prior Publication Data

US 2016/0364190 A1 Dec. 15, 2016

(30) Foreign Application Priority Data

Jun. 11, 2015 (JP) ................................ 2015-118354

(51) Int. Cl.
*G06F 3/12* (2006.01)

(52) U.S. Cl.
CPC .......... *G06F 3/1238* (2013.01); *G06F 3/1222* (2013.01); *G06F 3/1234* (2013.01); *G06F 3/1288* (2013.01)

(58) Field of Classification Search
CPC ...... G06F 3/129; G06F 3/1234; G06F 3/1222; G06F 3/1238
See application file for complete search history.

(56) References Cited

U.S. PATENT DOCUMENTS

| 2007/0268518 A1* | 11/2007 | Yokoyama | ............ G06F 21/608 358/1.15 |
| 2012/0096544 A1* | 4/2012 | Hosoda | ................... G06F 21/41 726/19 |
| 2014/0118789 A1* | 5/2014 | Kadota | ................... G06F 3/121 358/1.15 |

FOREIGN PATENT DOCUMENTS

JP 2012-84081 A 4/2012

* cited by examiner

*Primary Examiner* — Iriana Cruz
(74) *Attorney, Agent, or Firm* — Canon U.S.A., Inc. IP Division

(57) ABSTRACT

An information processing apparatus to execute an agent module for controlling communication between a print server and the information processing apparatus, which includes a conversion unit, a transmission unit, and a notification unit. The conversion unit converts a request received from a spooler system of the information processing apparatus. The transmission unit transmits the converted request to a destination corresponding to the print server. Where a first authentication error indicating that proxy authentication is required is received after the request is transmitted, the spooler system is notified of a second authentication error indicating that a different authentication is required. Where a request including authentication information usable for proxy authentication is received as a response to the second authentication error, the conversion unit adds the authentication information to the request as information for proxy authentication. The transmission unit then transmits the request to a destination corresponding to the print server.

19 Claims, 9 Drawing Sheets

FIG. 5
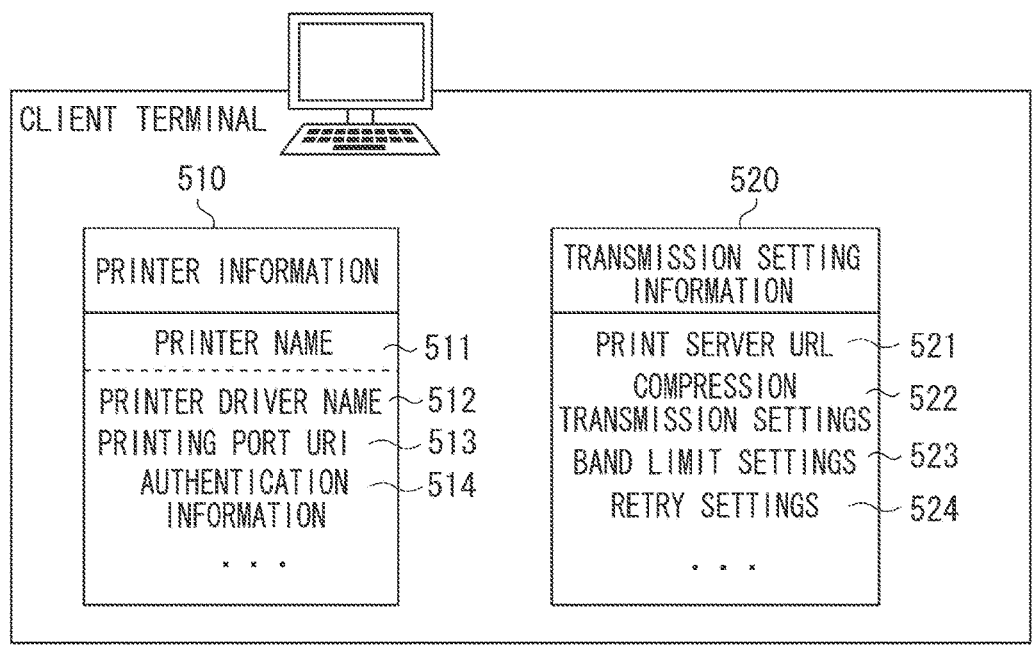
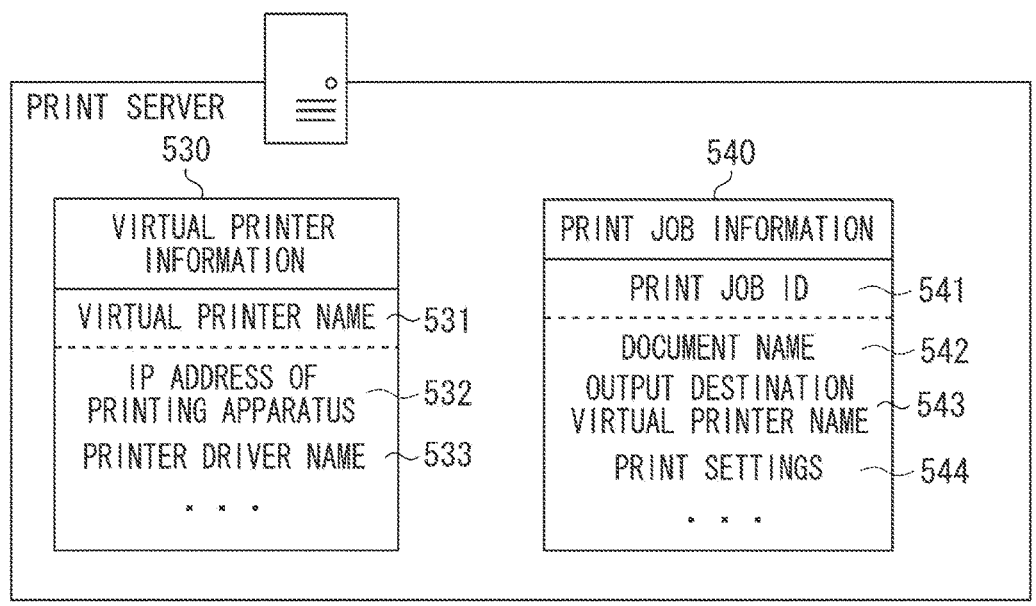

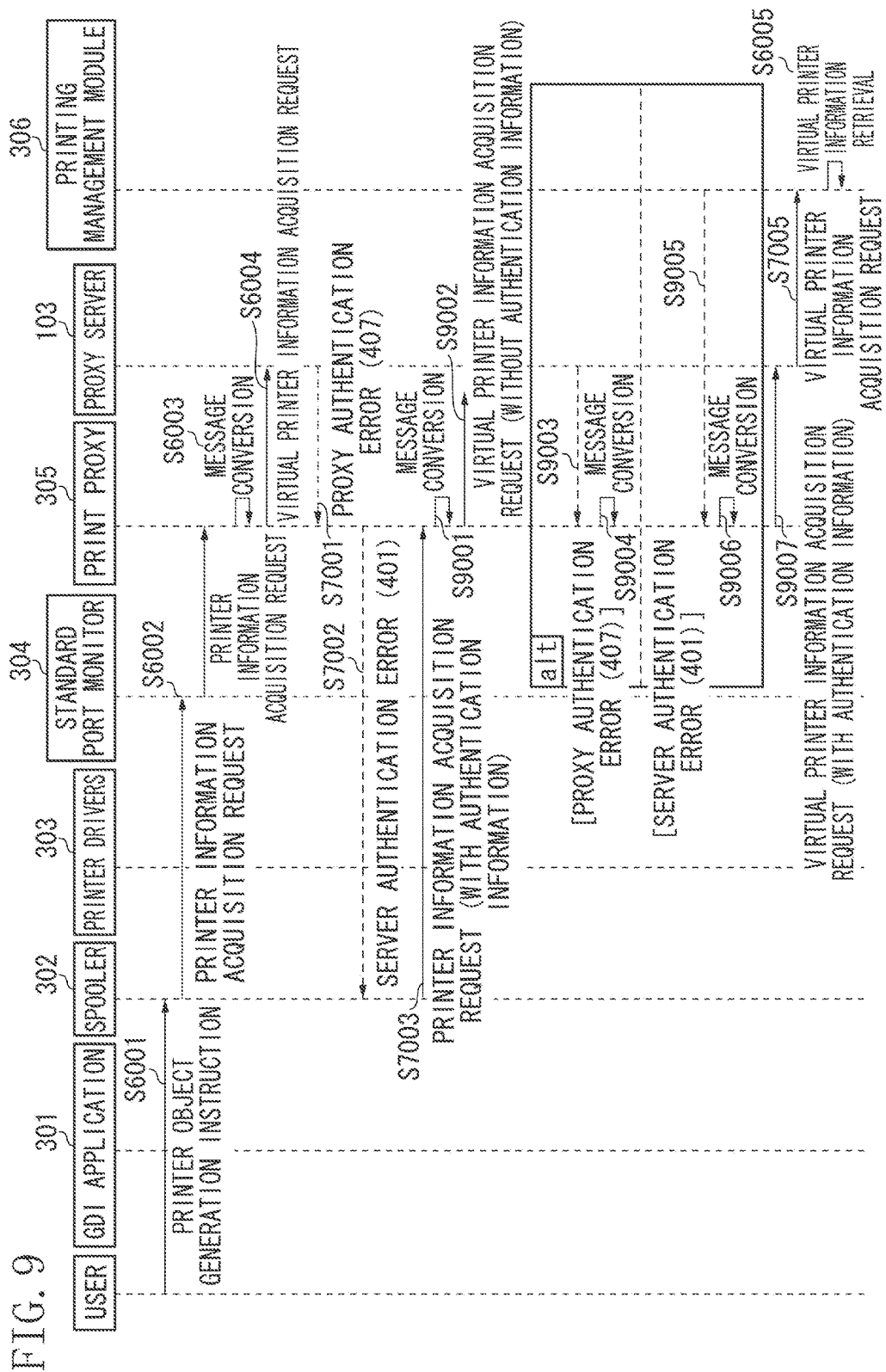

INFORMATION PROCESSING APPARATUS AND CONTROL METHOD BY REQUEST PROCESSING MODULE OPERATING ON INFORMATION PROCESSING APPARATUS

BACKGROUND OF THE INVENTION

Field of the Invention

The present invention relates to an authentication technique in communication using ports of protocols supported as standard by an operation system (OS), such as the Internet Printing Protocol (IPP).

Description of the Related Art

When performing print processing in an information processing apparatus (such as a client terminal) on which an OS operates, it is possible to specify a standard port monitor built in the OS and instruct the standard port monitor to perform printing. The standard port monitor can transmit print data generated by a printer driver from a client terminal to a printing apparatus.

Also in a printing system including a print server in addition to a client terminal and a printing apparatus, a user is able to input print data to the print server by specifying a standard port monitor and issuing a printing instruction to a virtual printer managed on the print server. The print data input to the virtual printer of the print server is subsequently transmitted to the printing apparatus by using a function of the virtual printer and then printed.

In the above-described printing system, a proxy server may exist between the client terminal and the print server. For example, printing by the Internet Print Protocol (IPP) using standard ports of the Windows (registered trademark) system operates based on proxy settings of the OS.

When the client terminal inputs print data to the print server by using the IPP, a spooler system for managing ports on the client terminal transmits a request to the proxy server. In communication between the spooler system and the proxy server, proxy authentication is required. When this authentication fails, the proxy server transmits a proxy authentication error notification to the spooler system.

Japanese Patent Application Laid-Open No. 2012-84081 which is a conventional technique discusses a method for prompting a user to manually input authentication information if an authentication error occurs between an application and a proxy server.

In this case, according the OS specifications, when a spooler system itself transmits a request to the proxy server, the spooler system transmits authentication information managed by the spooler system itself in response to a proxy authentication error notification from the proxy server. This processing causes proxy authentication to be performed on the proxy server.

The above-described standard port monitor built in the OS is provided only with a simple function of transmitting print data. For example, in the case of temporary communication breakdown during data transmission, an error occurs without undergoing retry processing. More specifically, the standard port monitor is not provided with sufficient communication control and retry processing functions required in print data transfer. Therefore, a printing apparatus vendor offers a custom port monitor implementing such communication control and retry processing functions to be used instead of the standard port monitor.

On the other hand, in an environment of a new OS such as Microsoft Windows (registered trademark) 8, a new printing system has been implemented. In the printing system, a custom port monitor offered by a printer vendor cannot be registered and only the standard port monitor is to be used.

To implement the above-described communication control and retry processing functions even under the new OS environment, it is conceivable to provide a communication control module for mediating communication (such as a request) between the standard port monitor of the client terminal instead of the custom port monitor, and the print server as an agent. Then, such an agent module transfers print data while implementing required communication control and retry processing.

However, even when an agent module is used, there is a problem that proxy authentication cannot be performed in a case where a proxy server exists between the agent module and the print server.

In the case of printing performed via the above-described agent module, the spooler system which manages ports transmits a request to the Uniform Resource Locator (URL) corresponding to the agent module. Then, the agent module forwards a request to the print server via the proxy server. Suppose that a proxy authentication error occurs between the agent module and the proxy server in this case. Naturally, the agent module notifies the spooler system of the proxy authentication error. However, according to the OS specifications, the spooler system is configured not to transmit the authentication information in response to such a proxy authentication error notification since the spooler system itself has not transmitted a request to the proxy server. As a result, proxy authentication fails in IPP-based printing performed via the agent module.

As discussed in Japanese Patent Application Laid-Open No. 2012-84081, it is conceivable to offer a mechanism for causing a user to input authentication information via an agent module upon occurrence of a proxy authentication error. In this case, however, although the user has set the authentication information in advance to the OS, user convenience is deteriorated since authentication information needs to be manually re-input each time printing is performed via the agent module.

Further, it is not possible to realize an unmanned printing system in which, for example, a print job is entered from a client terminal to a print server.

SUMMARY OF THE INVENTION

According to an aspect of the present invention, an information processing apparatus to execute, by using a processor, an agent module for controlling communication between a print server and the information processing apparatus, the information processing apparatus, as functions of the agent module, includes a conversion unit configured to perform, in a case where a request is received from a spooler system of the information processing apparatus, processing for converting the request, a transmission unit configured to transmit the request after the conversion processing is performed to a destination corresponding to the print server, and a notification unit configured to notify, in a case where a first authentication error indicating that proxy authentication is required is received from a proxy server after the transmission unit transmits the request, the spooler system of a second authentication error indicating that authentication different from the proxy authentication is required, wherein, in a case where a request including authentication information usable for proxy authentication is received from the spooler system as a response to the second authentication error, the conversion unit, as conversion processing for the request, adds the authentication information to the request as information for proxy authentication, and wherein the transmission unit transmits the request with the authentication information added as information for proxy authentication to a destination corresponding to the print server.

Further features of the present invention will become apparent from the following description of exemplary embodiments with reference to the attached drawings.

BRIEF DESCRIPTION OF THE DRAWINGS

FIG. 5 illustrates examples of information managed within a printing system according to the present invention.

FIG. 9 is a sequence diagram illustrating proxy authentication in a printing system according to the second exemplary embodiment.

DESCRIPTION OF THE EMBODIMENTS

Exemplary embodiments for implementing the present invention will be described below with reference to the accompanying drawings. In an example, an agent module for controlling communication between a print server and an information processing apparatus, executed by the information processing apparatus, determines an error to be transmitted as a response to a spooler system for managing authentication information, according to a type of an authentication error which occurs in communication with the print server.

Figure 1:
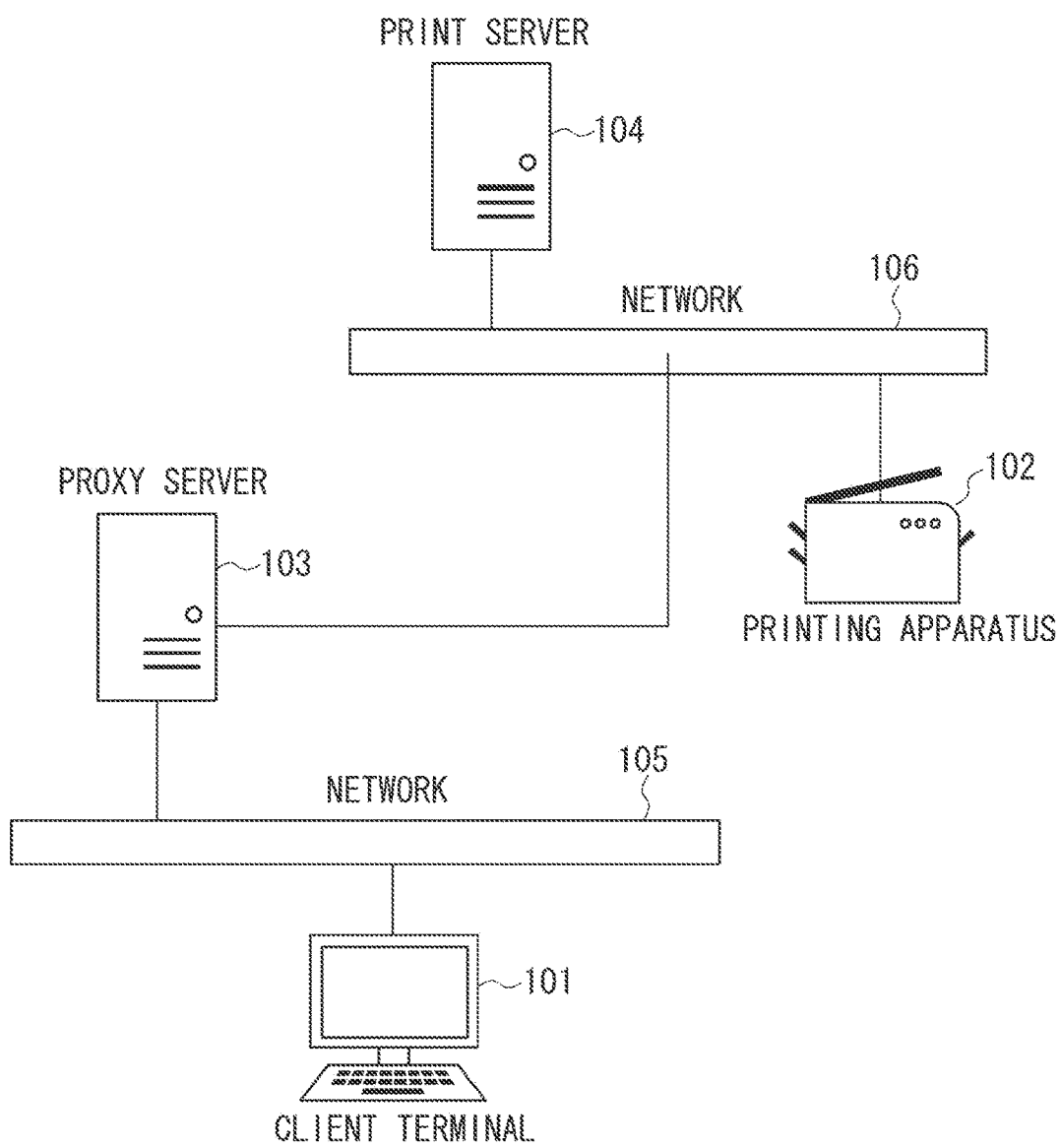
FIG. 1 is a block diagram illustrating an example of a configuration of a network system according to the present invention.

A first exemplary embodiment will be described below. FIG. 1 is a block diagram illustrating an example of a configuration of a network system according to the present invention.

Referring to FIG. 1, a client terminal 101, a printing apparatus 102, a proxy server 103, and a print server 104 are connected with each other via networks 105 and 106. The present invention is also applicable to the case where a plurality of the client terminals 101 and the printing apparatuses 102 are connected.

Each of the networks 105 and 106 is what is a so-called communication network which enables data transmission and reception, and may be implemented by a combination of a local area network (LAN), a wide area network (WAN), such as the Internet, and all other networks. The communication methods between the client terminal 101 and the proxy server 103, between the proxy server 103 and the print server 104, and between the print server 104 and the printing apparatus 102 may be different from each other. The communication between apparatuses included in the present exemplary embodiment may be wired communication using an Ethernet (registered trademark) cable or wireless communication using an electric wave, light, etc.

The present invention assumes communication via the proxy server 103 when the client terminal 101 communicates with the print server 104. The client terminal 101 incorporates an environment for executing an application having a viewer and an editor function allowing the user to refer to and print a target document. The client terminal 101 includes, for example, a desktop personal computer (PC), a notebook PC, a smart phone, and a tablet PC.

The proxy server 103 serves as a proxy to perform communication from a terminal on the network 105 to a terminal on the network 106. The proxy server 103 cooperates with an authentication server (not illustrated) to perform communication control between the network 105 and the network 106. The print server 104 includes an external interface and receives a document data input request and a document data printing request from the client terminal 101 via a network. The network system may include a plurality of the print servers 104. In this case, these print servers 104 may be redundantly configured so as to virtually behave as one server via a load balancer. The print server 104 monitors and manages the printing apparatus 102, controls and monitors print jobs, and forwards a print job to the printing apparatus 102.

Figure 2:
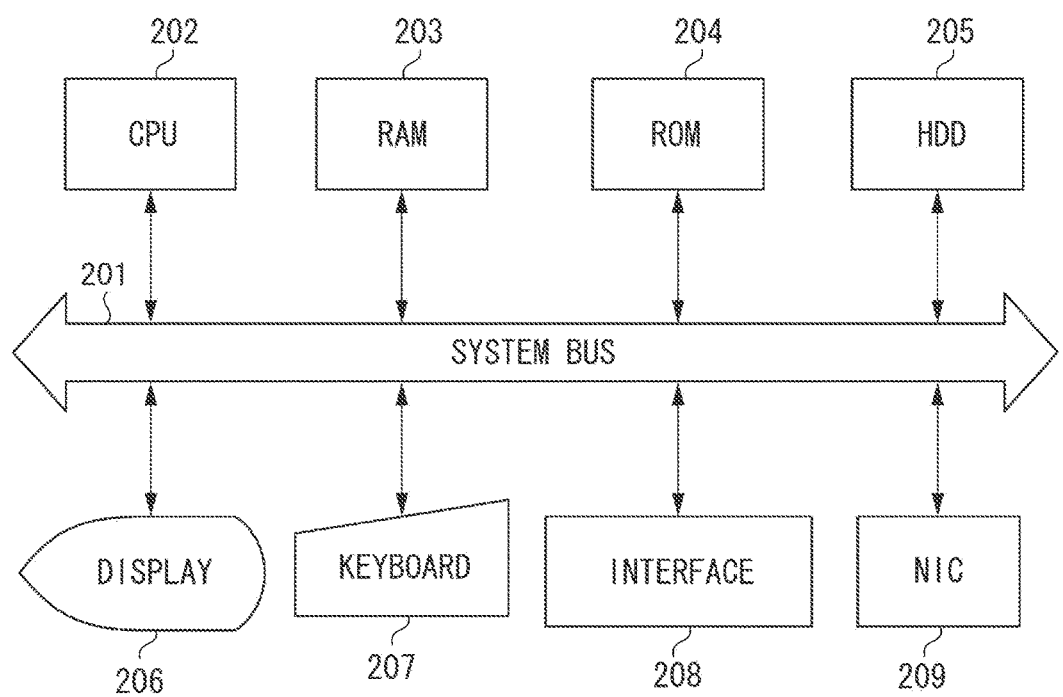
FIG. 2 illustrates an example of a hardware configuration of an information processing apparatus according to the present invention.

FIG. 2 illustrates an example of a hardware configuration of an information processing apparatus such as the client terminal 101, the proxy server 103, and the print server 104.

Referring to FIG. 2, a central processing unit (CPU) 202 controls the entire information processing apparatus. More specifically, the CPU 202 executes application programs and an OS stored in a hard disk (HDD) 205, and performs control to temporarily store information and files required to execute a program in a random access memory (RAM) 203. A read only memory (ROM) 204 as a storage unit stores programs such as basic input/output (I/O) programs, print data used for print processing, and various data such as printer information. A RAM 203 as a temporary storage unit functions as a main memory of the CPU 202 and a work area. An external storage unit 205 is a hard disk drive (HDD) which functions as a large volume memory. The storage unit 205 stores application programs such as a document editor, a print server program, the OS, various drivers, a program for implementing the print proxy, and related programs. Exemplary embodiments (described below) are implemented when each program stored in the storage unit 205 is executed. A display unit 206 displays a command input from a keyboard 207, an output screen of an application, and a printer status. An external apparatus interface (I/F) 208 is an interface for connecting a printing apparatus, a universal serial bus (USB) device, and a peripheral device. The keyboard 207 is an instruction input unit. A system bus 201 manages data flow in the client terminal 101 and the print server 104. A network interface card (NIC) 209 exchanges data with an external apparatus via the interface 209 and the networks 105 and 106. The configuration of the above-described computer is only an example, and the present invention is not limited to the example of the configuration illustrated in FIG. 2. For example, data and programs are stored in different storage units (the ROM 204, the RAM 203, and the HDD 205) according to features of data and programs.

Figure 3:
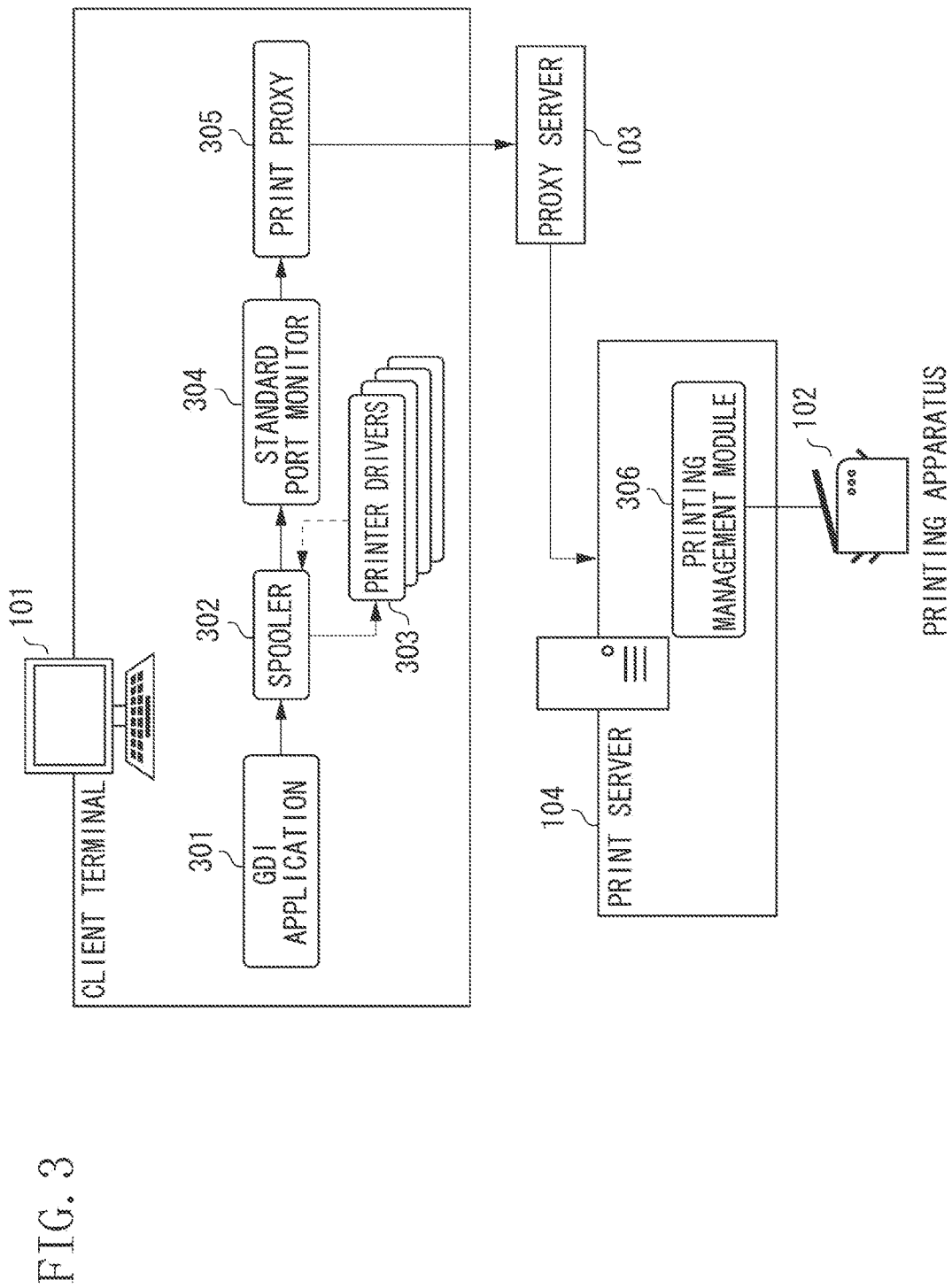
FIG. 3 illustrates examples of module configurations of a client terminal and a print server according to the present invention.

FIG. 3 illustrates examples of module configurations of a client terminal and a print server according to the present invention.

The client terminal 101 includes a Graphics Device Interface (GDI) application 301, a spooler 302, at least one spooler printer driver 303, a standard port monitor 304, and a print proxy 305.

The GDI application 301 is an application enabling graphical drawing of a printing target document file to be output on the display unit 206 and the spooler 302. Although the present exemplary embodiment assumes an editor application provided with a print function through the GDI of the OS, an application is not limited thereto. Other applications enabling drawing data to be output to the spooler 302 is also applicable. The GDI application 301 instructs a printer object pre-registered in the OS to perform printing in response to a printing instruction of the user. A printer object is managed by the spooler 302 and includes printer information 510 (described below).

The spooler 302 configures a spooler system of the OS. The spooler 302 manages the printer information 510 related to a printer object, and perform print data spooling. In response to a printing instruction from the GDI application 301, the spooler 302 instructs the printer driver 303 associated with the printer object to generate print data. The spooler 302 acquires virtual printer information 530 on the print server 104, and performs spooling of print data received from the printer driver 303 via the print proxy 305. The spooler 302 transfers the spooled print data to a predetermined print port controlled by the standard port monitor 304.

In response to a request from the spooler 302, the printer driver 303 generates print data such as Page Description Language (PDL) interpretable by the printing apparatus 102, and transmits the generated print data to the spooler 302. Information such as a document name and print settings can be included in print data generated by the printer driver 303.

The standard port monitor 304 is mounted as standard on the OS. The standard port monitor 304 controls the print port which is an output from the spooler 302, and, according to the type of the print port such as the Transmission Control Protocol/Internet Protocol (TCP/IP), requests the print proxy 305 to output print data and acquire the virtual printer information 530. The standard port monitor 304 supports general print protocols. In the present exemplary embodiment, the standard port monitor 304 performs Internet Printing Protocol (IPP)-based communication with the print proxy 305 by using TCP/IP ports. The communication protocol between the standard port monitor 304 and the print proxy 305 is not limited to the IPP, and may be any protocol as long as a processing flow (described below) is implemented.

The print proxy 305 communicates with a printing management module 306 on the print server 104 according to a request from the spooler 302 via the standard port monitor 304. More specifically, the print proxy 305 operates as an agent module for controlling and mediating communication between the standard port monitor 304 and the print server 104. The print proxy 305 transfers print data and the virtual printer information 530 between the client terminal 101 and the print server 104. The print proxy 305 further performs band limit control on communication with the print servers 104, print data compression transmission, and recovery according to transmission setting information 520 (described below).

The print server 104 includes the printing management module 306. The printing management module 306 manages the virtual printer information 530 and the print job information 540 (described below), and returns a response in response to a request of the print proxy 305 of the client terminal 101. The printing management module 306 is connected with at least one printing apparatus 102 associated with a virtual printer stored in the virtual printer information 530. The printing management module 306 has a function of transmitting print data to the associated printing apparatus 102 and a function of monitoring the status of the printing apparatus 102 according to a printing request to the virtual printer.

Figure 4:
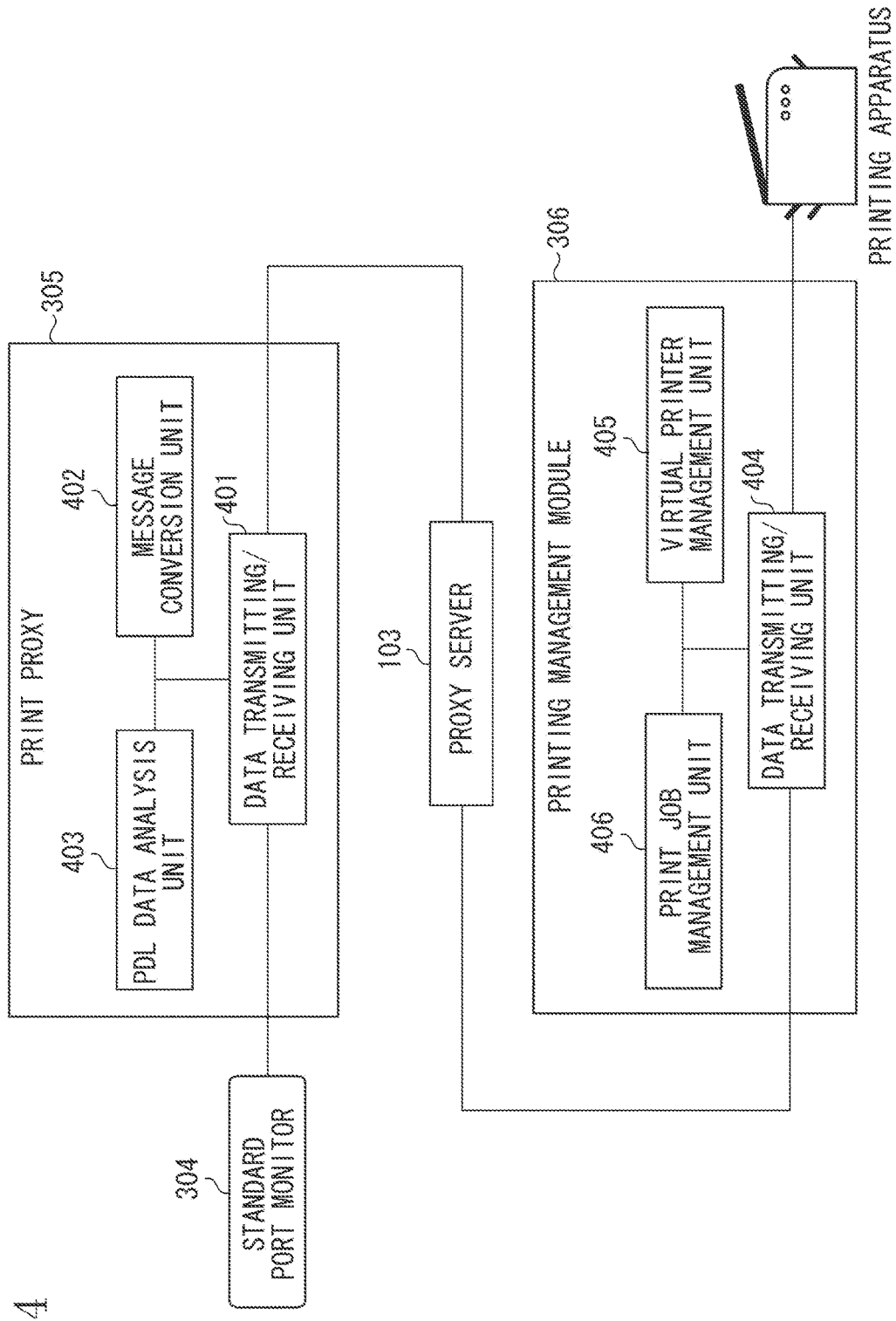
FIG. 4 illustrates detailed configurations of a print proxy and a printing management module.

The print proxy 305 and the printing management module 306 which characterize the present invention will be described below with reference to FIG. 4. The print proxy 305 and the printing management module 306 are implemented when a related program stored in a storage device (the HD 205) of the client terminal 101 and the print server 104 is loaded into the RAM 203 and executed by the CPU 202.

The print proxy 305 includes a data transmitting/receiving unit 401, a message conversion unit 402, and a PDL data analysis unit 403.

The data transmitting/receiving unit 401 manages communication with an external configuration of the print proxy 305. When the data transmitting/receiving unit 401 receives an IPP-based request message from the standard port monitor 304 of the OS, the data transmitting/receiving unit 401 transfers the contents of the request to the message conversion unit 402. Then, the data transmitting/receiving unit 401 receives a message from the print server 104 as a response to the request, and transfers a request including the message to the print server 104. When the data transmitting/receiving unit 401 receives a message such as a response from the print server 104, the data transmitting/receiving unit 401 transfers the message to the message conversion unit 402. Then, the data transmitting/receiving unit 401 receives an IPP-based response message as a response from the message conversion unit 402, and transfers it to the standard port monitor 304.

In communication with the print server 104, the data transmitting/receiving unit 401 performs print data compression, network band control, and retry processing according to network settings in the transmission setting information 520 (described below). More specifically, the data transmitting/receiving unit 401 performs extended processing during printing that cannot be implemented by the standard port monitor 304. Thus, the data transmitting/receiving unit 401 achieves more stable communication between the client terminal 101 and the print server 104.

As described above, communication between the data transmitting/receiving unit 401 and the printing management module 306 is performed via the proxy server 103. The processing of proxy authentication to be performed in this communication will be described in detail below with reference to FIG. 7.

The message conversion unit 402 interconverts an IPP-based message between the print proxy 305 and the standard port monitors 304, and a message conforming to an arbitrary protocol between the print proxy 305 and the print server 104. In communication between the print proxy 305 and the print server 104, the present exemplary embodiment uses a message conforming to the Hypertext Transfer Protocol (HTTP) which is used by the print proxy 305 to call a web service of the print server 104.

When the message conversion unit 402 receives a printing request message from the data transmitting/receiving unit 401, the message conversion unit 402 transmits print data to the PDL data analysis unit 403 and receives information such as a document name and print settings included in the print data.

The PDL data analysis unit 403 includes the information received from the message conversion unit 402 in a request to be transmitted to the print server 104. When the PDL data analysis unit 403 receives print data from the message conversion unit 402, the PDL data analysis unit 403 analyzes the print data. When the print data includes information about the above-described job, the PDL data analysis unit 403 extracts the information from the print data, and returns it to the message conversion unit 402.

The printing management module 306 includes a data transmitting/receiving unit 404, a virtual printer management unit 405, and a print job management unit 406.

The data transmitting/receiving unit 404 manages communication with an external configuration of the printing management module 306. The data transmitting/receiving unit 404 receives each request from the print proxy 305, and requests the print job management unit 406 and the virtual printer management unit 405 to perform processing according to the contents of each request. When the data transmitting/receiving unit 404 receives a virtual printer information acquisition request, the data transmitting/receiving unit 404 makes an inquiry about the virtual printer information 530 to the virtual printer management unit 405 by specifying the virtual printer name included in each request. Thus, the data transmitting/receiving unit 404 acquires the corresponding virtual printer information 530. When the data transmitting/receiving unit 404 receives a print job input request, the data transmitting/receiving unit 404 transfers the print job information 540 included in the request and the print data to the print job management unit 406 to request it to register the print job information 540. The data transmitting/receiving unit 404 performs communication with a printing apparatus 102 connected with the print server 104 via a network. The data transmitting/receiving unit 404 has a function of monitoring the status of a print job currently being printed and information of the printing apparatus 102, and a function of notifying the virtual printer management unit 405 and the print job management unit 406 of the status and the information.

The virtual printer management unit 405 manages the virtual printer information 530 (described below). When the virtual printer management unit 405 receives an inquiry about the virtual printer information 530, the virtual printer management unit 405 retrieves the corresponding virtual printer information 530 in the preregistered virtual printer information 530 and returns a response. When the virtual printer management unit 405 receives information of the printing apparatus 102, the virtual printer management unit 405 updates the corresponding virtual printer information 530 based on the contents of the information.

The print job management unit 406 manages the print job information 540 (described below). When the print job management unit 406 receives a print data input request, the print job management unit 406 registers the print job information 540 based on the contents of the request, and retains print data associated with the print job information 540. When the print job management unit 406 receives the print job information 540 currently being printed, the print job management unit 406 updates the print job information 540 based on the contents of the print job information 540.

FIG. 5 illustrates examples of information managed in the printing system according to the present invention.

The spooler 302 on the client terminal 101 manage the printer information 510.

The printer information 510 is information about printer objects registered in the OS. A printer name 511 is an identifier for uniquely determining a printer object on the OS and referred to by the GDI application 301. A printer driver name 512 represents the printer driver 303 to be used when a printing instruction is issued to a printer object. The printer driver name 512 indicates any one of the printer drivers 303 installed in the client terminal 101.

A print port Uniform Resource Identifier (URI) 513 represents an output destination of print data when a printing instruction is issued. The following information is set as the print port URI 513 in the present exemplary embodiment. "http://127.0.0.1:8000/printers/myprinter/.printer" This information includes information indicating the print proxy 305 as a destination, a port, and a virtual printer name identifying a virtual printer on the print server 104. For example, "127.0.0.1:8000" is information indicating the print proxy 305, and "myprinter" is information indicating a virtual printer name.

Authentication information 514 stores authentication information for the proxy server 103 and authentication information for the print service 104. The spooler 302 assumed in the present invention is a module that configures a spooler system conforming to the OS specifications. Regardless of the proxy server 103 and print services, only one piece of authentication information can be set as the authentication information 514.

The print proxy 305 on the client terminal 101 retains the transmission setting information 520. The transmission setting information 520 includes transmission setting values for communication with the print servers 104.

A print server URL 521 represents a receiving end point of the print server 104, and represents a destination of each request transmitted by the print proxy 305. Compression transmission settings 522, band limit settings 523, and retry settings 524 are setting values required by the print proxy 305 to perform control to communicate with the print server 104.

The printing management module 306 on the print server 104 manages the virtual printer information 530 which is information about a virtual printer registered in the print server 104.

A virtual printer name 531 is the name of a virtual printer on the print server 104, and is an identifier for uniquely determining the corresponding virtual printer information 530. An Internet Protocol (IP) address 532 of the printing apparatus 102 indicates the IP address of the printing apparatus 102 associated with a virtual printer. A printer driver name 533 is the name of the printer driver 303 corresponding to the printing apparatus 102. The printer driver name 533 indicates that a virtual printer is able to print the print data generated by the printer driver 303.

The printing management module 306 on the print server 104 further manages the print job information 540 which is information about a job corresponding to print data input to the print server 104.

A print job identifier (ID) 541 uniquely determines a job on the print server 104. A document name 542 is the name of a document file which is the source of the input print data. An output destination virtual printer name 543 is an identifier indicating the virtual printer information 530 associated with a print job. Print settings 544 include settings accompanying the print data.

<Sequence Up to Print Data Input in Printing System>

Figure 6:
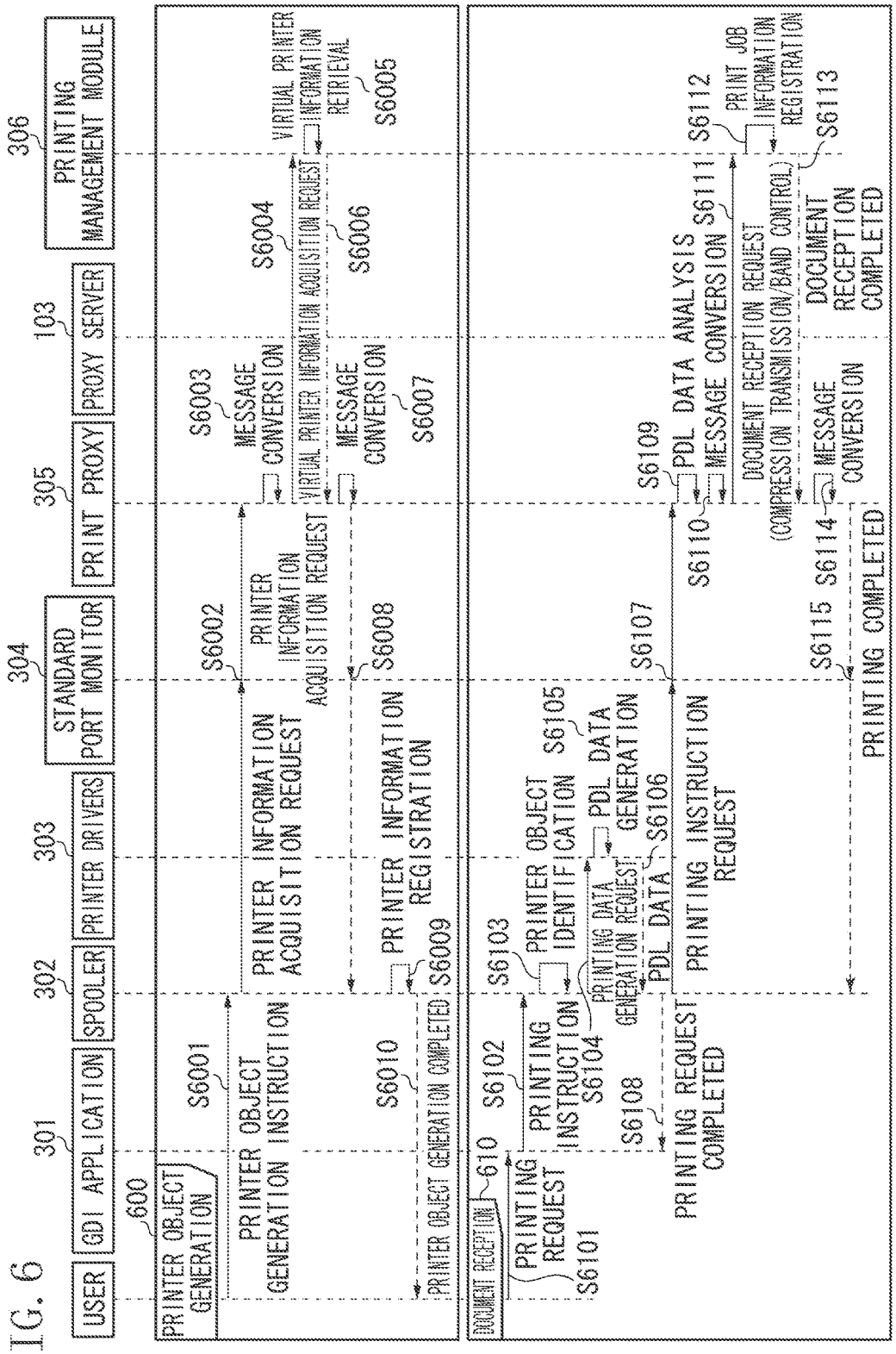
FIG. 6 is a diagram illustrating sequence up to print data inputting in a printing system according to a first exemplary embodiment.

A sequence illustrated in FIG. 6 indicates an overview of processing in the printing system according to the present exemplary embodiment, such as processing for generating a printer object and processing for inputting print data.

In the present exemplary embodiment, all communications between the client terminal 101 and the print server 104 are assumed to be performed via the proxy server 103. When a proxy authentication error occurs in communication therebetween, the print proxy 305 performs characteristic control. Before describing the characteristic control, an overview of two example communications between the client terminal 101 and the print server 104 when the error does not occur will be described below with reference to FIG. 6.

A sequence 600 indicates processing for generating a printer object on the client terminal 101.

In step S6001, in response to a user input, the spooler 302 receives a printer object generation instruction including specifications of the printer name 511, the printer driver name 512, and the print port URI 513. In step S6002, via the standard port monitor 304, the spooler 302 transmits an IPP-based printer information acquisition request to the print port URI 513 specified in step S6001. As described above, the print port URI 513 is a URI including the destination of the print proxy 305, a port, and a virtual printer name.

When the data transmitting/receiving unit 401 of the print proxy 305 receives the printer information acquisition request, then in step S6003, the message conversion unit 402 of the print proxy 305 extracts the virtual printer name 531 from the print port URI 512 included as the destination in the received printer information acquisition request. The message conversion unit 402 further converts the extracted information into a virtual printer information acquisition request to the print service 104. After completion of message conversion in step S6003, then in step S6004, the data transmitting/receiving unit 401 transmits the virtual printer information acquisition request to the print server URL 521, referring to the transmission setting information 520. The data transmitting/receiving unit 401 of the print proxy 305 communicates with the print server 104 according to the compression transmission settings 522, the band limit settings 523, and the retry settings 524. When authentication by the proxy server 103 is successfully completed, the print proxy 305 succeeds in transmission of the virtual printer information acquisition request to the print server 104 as shown in step S6004.

When the data transmitting/receiving unit 404 of the printing management module 306 receives the virtual printer information acquisition request, then in step S6005, the virtual printer management unit 405 of the printing management module 306 retrieves the corresponding virtual printer information 530 by using the virtual printer name 531 included in the request. In step S6006, the data transmitting/receiving unit 404 transmits as a response the virtual printer information 530 found in the retrieval in step S6005 to the print proxy 305.

In step S6006, when the data transmitting/receiving unit 401 of the print proxy 305 receives a response to the virtual printer information acquisition request, then in step S6007, the message conversion unit 402 of the print proxy 305 converts the contents of the response into an IPP-based message. In step S6008, the data transmitting/receiving unit 401 transmits the converted message as a response to the printer information acquisition request from the standard port monitor 304 in step S6002.

In step S6009, according to the response received via the standard port monitor 304 in step S6008, the spooler 302 registers the printer information 510 based on the contents included in the printer object generation instruction from a user in step S6001. In step S6009, the spooler 302 notifies the user of completion of the generation of a printer object via a screen.

Subsequently, the sequence 610 indicates processing for inputting print data from the client terminal 101 to the print server 104.

In step S6101, the GDI application 301 receives a printing request including specifications of printing target document data, a printing destination printer name, and print settings from the user. In step S6102, based on the contents of the printing request, the GDI application 301 transmits a printing instruction to the spooler 302.

In step S6103, by using the printer name 511 included in the received printing instruction, the spooler 302 identifies the corresponding printer object, referring to the printer information 510, and acquires the printer driver name 512. In step S6104, the spooler 302 transmits a print data generation request to the printer driver 303 corresponding to the acquired printer driver name 512. In step S6105, the printer driver 303 generates PDL data (print data) including a document name of document data and print settings included in the print data generation request. In step S6106, the printer driver 303 returns the generated PDL data to the spooler 302.

In step S6107, the spooler 302 transmits the received PDL data as a printing request to the print port URI 513 of the printer information 510. This printing request is an IPP-message including PDL data, and is transmitted to the print proxy 305 via the standard port monitor 304. In step S6108, when the transmission of the printing request is completed, the spooler 302 notifies the GDI application 301 of completion of the printing request.

In step S6109, upon reception of the printing request by the data transmitting/receiving unit 401 of the print proxy 305, the PDL analysis unit 403 analyzes the PDL data included in the printing request. This analysis extracts the document name and print settings included in the PDL data.

In step S6110, as message conversion processing, the message conversion unit 402 of the print proxy 305 generates a print data input request to the print server 104 by using the information extracted in step S6109 and the virtual printer name included in print port URI 513 of the printing request. In step S6111, the data transmitting/receiving unit 401 of the print proxy 305 transmits a print data input request according to the setting values of the transmission setting information 520, to the print server 104. The print proxy 305 transmits a request conforming to the HTTP to the print server 104. When authentication by the proxy server 103 is successfully completed, as illustrated in step S6111, the transmission of the print data input request to the print server 104 succeeds.

The data transmitting/receiving unit 404 of the printing management module 306 on the print server 104 receives the print data input request from the print proxy 305. In step S6112, the print job management unit 406 of the printing management module 306 issues a new print job ID 541 and, at the same time, registers the print job information 540 based on the information included in the print data input request. Upon completion of the registration of the print job information 540, then in step S6113, the data transmitting/receiving unit 404 transmits as a response a document input completion notification to the print proxy 305.

In step S6114, upon reception of the document input completion notification by the data transmitting/receiving unit 401 of the print proxy 305, the message conversion unit 401 converts the contents of the notification into an IPP-based message. In step S6115, the data transmitting/receiving unit 401 transmits the message after the conversion indicating printing completion, to the spooler 302 via the standard port monitor 304.

<Sequence Related to Proxy Authentication>

Figure 7:
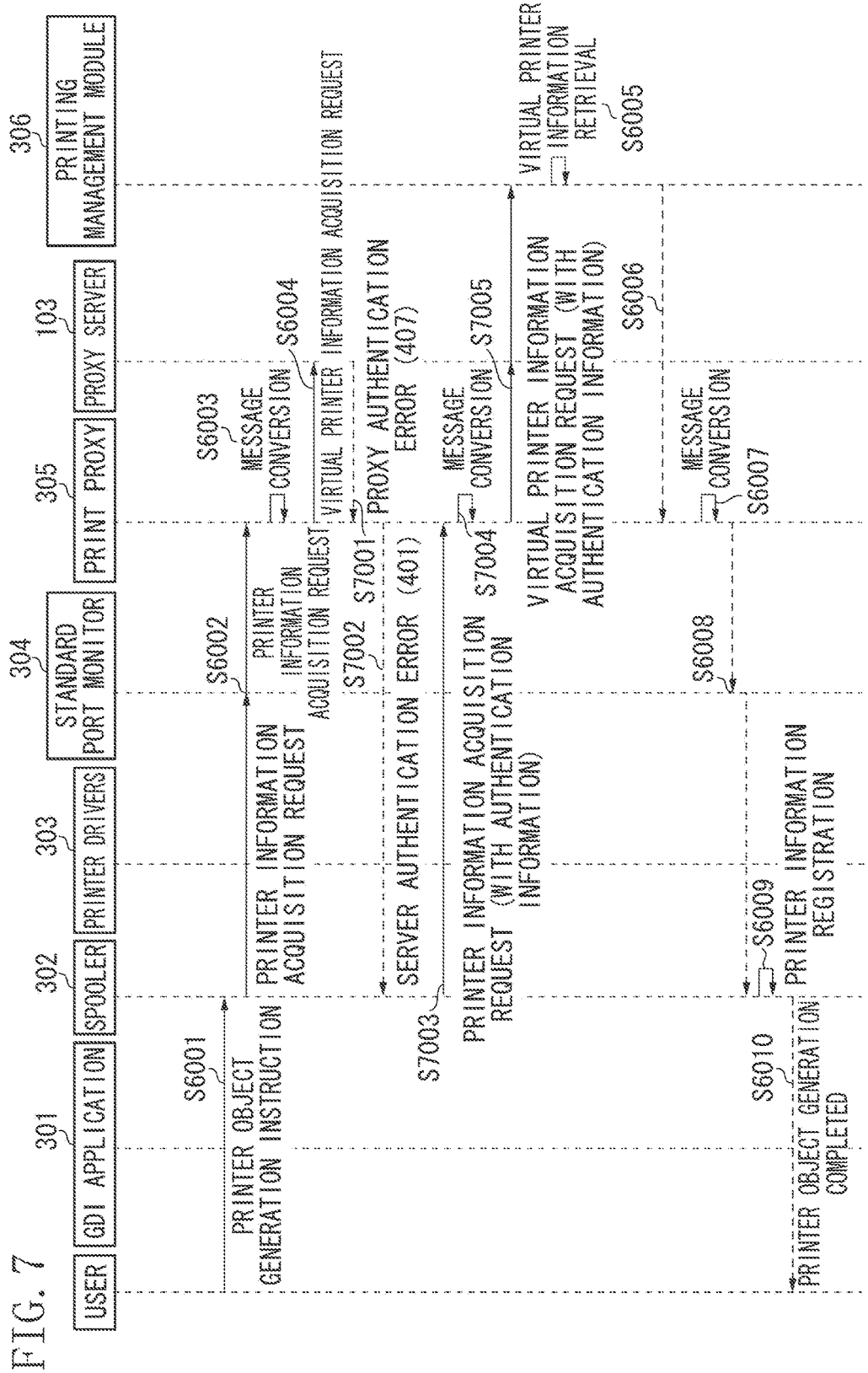
FIG. 7 is a sequence diagram illustrating proxy authentication in the printing system according to the first exemplary embodiment.

FIG. 7 is a sequence diagram illustrating processing of the print proxy 305 when the proxy server 103 fails in authentication for a request from the client terminal 101, with reference to the sequence 600 illustrated in FIG. 6 as an example. Referring to FIG. 7, processing identical to processing illustrated in FIG. 6 is assigned the same reference numeral, and redundant descriptions thereof will be omitted.

When the print proxy 305 transmits the virtual printer information acquisition request to the printing management module 306 in step S6004, then in step S7001, the data transmitting/receiving unit 401 of the print proxy 305 receives a proxy authentication error notification from the proxy server 103.

Normally, the spooler 302 operates according to the OS specifications. When proxy settings are not made or when an exception setting for not using a proxy for specific communication is made on the OS, the spooler 302 does not add the authentication information to a request such as the virtual printer information acquisition request in step S7001.

Even if a proxy authentication error is transmitted as a response to such an IPP-based request, the spooler 302 does not retransmit the request with added authentication information. This is because the spooler 302 has transmitted the virtual printer information acquisition request to the print server URL 521 that indicates the proxy server 103 in step S7001, and therefore does not recognize that a request has been transmitted to the proxy server 103.

In step S7002, therefore, the message conversion unit 402 of the print proxy 305 performs conversion processing on the proxy authentication error received from the proxy server 103 in step S7001. More specifically, the message conversion unit 402 converts (replaces) the proxy authentication error into an error (hereinafter referred to as a server authentication error) corresponding to (user) authentication which may possibly occur in the web server (not illustrated) on the print server 104. Then, the data transmitting/receiving unit 401 of the print proxy 305 transmits as a response a server authentication error after conversion to the spooler 302.

A message indicating a proxy authentication error received from the proxy server 103 has a setting "407 (Proxy-Authenticate)" as a status code included in the HTTP header. On the other hand, a message indicating a server authentication error after the conversion is performed has a setting "401 (Authenticate)" as a status code included in the HTTP header. The server authentication error indicates that the authentication fails and the authentication other than the proxy authentication is required.

In step S7003, upon reception of a response including the status code indicating the server authentication error, the spooler 302 retransmits the printer information acquisition request with authentication information 514 added, to the print proxy 305. More specifically, the spooler 302 sets the authentication information 514 to "Authorization" of the HTTP request as an acquisition request.

As described above, the spooler 302 assumed in the present invention is a module conforming to the OS specifications. Only one piece of authentication information is set as the authentication information 514 regardless of the proxy server 103 and the print service (the print server 104). Therefore, both in the case of a proxy authentication error as a response to a request to the proxy server 103 and in the case of a server authentication error as a response in step S7002, the spooler 302 sets the same authentication information to the request to be retransmitted.

In step S7004, the message conversion unit 402 of the print proxy 305 extracts and duplicates the authentication information included in the received acquisition request, and adds as proxy authentication information the duplicated authentication information to the virtual printer information acquisition request made to the print service 104. More specifically, the message conversion unit 402 duplicates the "Authorization" information in the HTTP header of the printer information acquisition request, and adds "Proxy-Authorization" information to the virtual printer information acquisition request.

In step S7005, the data transmitting/receiving unit 401 of the print proxy 305 performs processing for transmitting the virtual printer information acquisition request converted in step S7004.

In a printing system in which the proxy server 103 does not exist and authentication is performed by a web server (not illustrated) on the print server 104, the print proxy 305 transmits the server authentication error received from the web server to the spooler 302 as it is as a response. The subsequent processing is similar to the processing described in steps S6003 to S6010.

According to the present exemplary embodiment, the print proxy 305 on the client terminal 101 determines an authentication error to be transmitted to the spooler 302 as a response according to the type of an authentication error occurred. This processing enables the print proxy 305 to extract the authentication information from the spooler 302 even if an authentication error occurs in the proxy server 103 when issuing a printing request via the print proxy 305 by using the standard port monitor 304 of the OS. Thus, it becomes possible to perform proxy authentication without causing inconvenience of re-inputting the authentication information to the user when an authentication error occurs.

A second exemplary embodiment will be described below. In the first exemplary embodiment, since the print proxy 305 is unable to determine which authentication to perform for each request, the print proxy 305 employs a method for duplicating the "Authorization" information and adding it to a request.

In the first exemplary embodiment, after the "Proxy-Authorization" information is referred to by the proxy server 103, the information is canceled at the time of communication with the printing management module 306. However, the "Authorization" information set in a request upon reception of a server authentication error by the spooler 302 is not canceled and transmitted to the print server 104 as it is. Since the processing by the printing management module 306 does not require the proxy authentication information, transmission of such authentication information to the print server 104 may possibly cause a security problem.

As processing added to the first exemplary embodiment, the present exemplary embodiment includes processing for determining whether a request from the spooler 302 includes authentication information for server authentication or authentication information for proxy authentication. The present exemplary embodiment has almost similar system configuration and apparatus configuration to the first exemplary embodiment, only their differences will be described in detail below.

Figure 8:
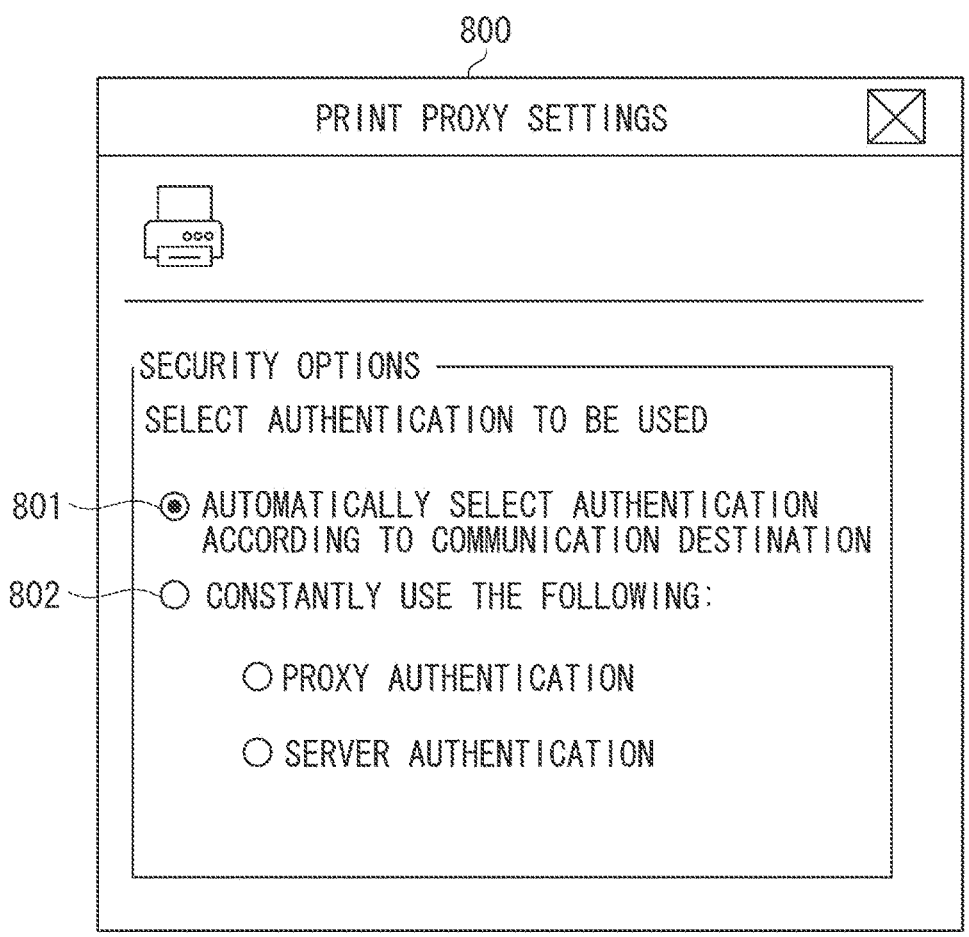
FIG. 8 illustrates an example of a print proxy setting screen according to a second exemplary embodiment.

FIG. 8 illustrates an example of a setting screen 800 provided by the print proxy 305. The user is able to specify authentication information to be used by the print proxy 305 by performing setting related to the print proxy 305 via the setting screen 800.

A setting item 801 indicates that the print proxy 305 will automatically determine authentication information to be used. A specific method for determining authentication information by the print proxy 305 when the setting item 801 is specified will be described below with reference to FIG. 9.

A setting item 802 indicates that the user specifies an authentication method in advance. According to the specification of the setting item 802, the print proxy 305 determines whether "Authorization" or "Proxy-Authorization" is to be added to the header of a request, further deletes the authentication information corresponding to the unselected authentication method from the header of the request. The setting items 801 and 802 are exclusive settings.

<Sequence Related to Proxy Authentication>

FIG. 9 is a sequence diagram illustrating in detail an example of processing when the setting item 801 is specified in the setting screen 800 on the print proxy 302. Referring to FIG. 8, processing overlapping with processing described with reference to FIG. 7 according to the first exemplary embodiment is assigned the same reference numeral, and redundant descriptions thereof will be omitted. Similar processing after step S6006 will be omitted from the sequence diagram illustrated in FIG. 9.

In step S9001, the message conversion unit 402 of the print proxy 305 deletes the authentication information included in the printer information acquisition request received from the spooler 302 in step S7003 to convert the printer information acquisition request into a virtual printer information acquisition request conforming to the HTTP. The print proxy 305 further temporarily retains the printer information acquisition request before deleting the authentication information.

In step S9002, the print proxy 305 transmits the virtual printer information acquisition request made after the conversion processing, to the print server URL 521. Although the print proxy 305 transmits a server authentication error to the spooler 302 in step S7002, the print proxy 305 does not internally manage data including this state. More specifically, the print proxy 305 is unable to determine whether the printer information acquisition request including the authentication information received in step S7003 corresponds to the server authentication error it transmitted as a response in step S7002. Therefore, the print proxy 305 retransmits the request not having the authentication information setting to print server URL 521, and then attempts to determine whether a proxy authentication error or a server authentication error is to be transmitted as a response.

The print proxy 305 switches subsequent processing according to the content of the authentication error transmitted in response to the virtual printer information acquisition request it transmitted in step S9002.

When the print proxy 305 receives a proxy authentication error (407) in step S9003, then in step S9004, the message conversion unit 402 of the print proxy 305 performs conversion processing for generating a virtual printer information acquisition request based on the printer information acquisition request retained in step S9001. More specifically, the print proxy 305 deletes the authentication information included as the "Authorization" information in the printer information acquisition request, and adds the authentication information as the "Proxy-Authorization" information to the HTTP header in the virtual printer information acquisition request conforming to the HTTP.

On the other hand, when the print proxy 305 receives a server authentication error (401) in step S9005, then in step S9006, the message conversion unit 402 of the print proxy 305 performs the conversion processing for generating a virtual printer information acquisition request based on the printer information acquisition request retained in step S9001. More specifically, the print proxy 305 does not add the authentication information as the "Proxy-Authorization" information to the HTTP header in the virtual printer information acquisition request conforming to the HTTP. The example of this sequence assumes processing performed when the print proxy 305 receives a proxy authentication error (407) from the proxy server 103 in step S7001. Therefore, the print proxy 305 does not receive a server authentication error (401).

In step S9007, the print proxy 305 transmits the virtual printer information acquisition request after the conversion processing in step S9004 to print server URL 521 (printing management module 306).

When the user specifies an authentication method for the setting item 802 in the setting screen 800, only processing similar to step S9004 or S9006 is performed instead of the processing in steps S9002 to S9006. More specifically, when the user specifies "Proxy Authentication" for the setting item 802, the print proxy 305 generates a virtual printer information acquisition request setting the authentication information only in the "Proxy-Authorization", similar to step S9004. When the user specifies "Server Authentication" for the setting item 802, the print proxy 305 generates a virtual printer information acquisition request without adding the authentication information as the "Proxy-Authorization" information, similar to step S9006.

According to the present exemplary embodiment, it is possible to prevent the authentication information from being carelessly transmitted to the outside.

The present invention also includes an apparatus and a system configured by suitably combining the above-described exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-118354, filed Jun. 11, 2015, which is hereby incorporated by reference herein in its entirety.

What is claimed is:

1. An information processing apparatus on which an operating system (OS) operates, the information processing apparatus comprising:
a memory storing instructions related to an agent module for controlling communication between an external server on a network and a system in the information processing apparatus; and
a processor which is capable of executing the instructions causing the information processing apparatus to:
receive a first authentication error via the network from a proxy server as an intermediary in communication to the server from the information processing apparatus after a transmission of a first request to a destination corresponding to the server, wherein the first authentication error indicates that proxy authentication is required;
notify the system in the information processing apparatus of a second authentication error indicating that authentication different from the proxy authentication is required, without notifying of the first authentication error;
receive a request including authentication information corresponding to the second authentication error from the system in the information processing apparatus as a response to the second authentication error;
perform conversion processing for the received request from the system in the information processing apparatus so that a second request, in which the authentication information corresponding to the second authentication error is added as authentication information usable for the proxy authentication, is generated; and
transmit the second request generated by the conversion processing to the destination corresponding to the server.

2. The information processing apparatus according to claim 1, wherein the server is a print server.

3. The information processing apparatus according to claim 1, wherein, as the conversion processing, a request conforming to an Internet Printing Protocol (IPP) is converted into a request conforming to a Hypertext Transfer Protocol (HTTP) as the second request.

4. The information processing apparatus according to claim 3, wherein the authentication information as information for proxy authentication is added in a header of the request conforming to the HTTP.

5. The information processing apparatus according to claim 1,
wherein information used for proxy authentication and information corresponding to the second authentication error can be respectively set in a header of a request conforming to a Hypertext Transfer Protocol (HTTP), and
wherein, in the conversion processing for a request to be transmitted to the destination corresponding to server in a case where the first authentication error is received from the proxy server, the authentication information is not added as information corresponding to the second authentication error but the authentication information is added as information to be used for proxy authentication.

6. The information processing apparatus according to claim 2, wherein the system in the information processing apparatus is a spooler system.

7. The information processing apparatus according to claim 6, wherein the first request which has been transmitted to the destination corresponding to the server is based on a request received from the spooler system via a standard port monitor of the OS.

8. The information processing apparatus according to claim 6, wherein a request received from the spooler system is at least one of a printer information acquisition request and a request for a printing instruction to the print server.

9. The information processing apparatus according to claim 1, wherein, in communication with the server, the agent module performs at least one of communication band limit control, data compression transmission, and recovery.

10. A control method for an information processing apparatus on which an operating system (OS) operates, wherein the information processing apparatus includes a memory storing instructions related to an agent module for controlling communication between an external server on a network and a system in the information processing apparatus, and a processor which is capable of executing the instructions, the control method comprising:
receiving a first authentication error via the network from a proxy server as an intermediary in communication to the server from the information processing apparatus after a transmission of a first request to a destination corresponding to the server, wherein the first authentication error indicates that proxy authentication is required;
notifying the system in the information processing apparatus of a second authentication error indicating that authentication different from the proxy authentication is required, without notifying of the first authentication error;
receiving a request including authentication information corresponding to the second authentication error from the system in the information processing apparatus as a response to the second authentication error;
performing conversion processing for the received request from the system in the information processing apparatus so that a second request, in which the authentication information corresponding to the second authentication error is added as authentication information usable for the proxy authentication, is generated; and
transmitting the second request generated by the conversion processing to the destination corresponding to the server.

11. The control method according to claim 10, wherein, as the conversion processing, a request conforming to an Internet Printing Protocol (IPP) is converted into a request conforming to a Hypertext Transfer Protocol (HTTP) as the second request.

12. The control method according to claim 11, wherein the authentication information as information for proxy authentication is added in a header of the request conforming to the HTTP.

13. The control method according to claim 10,
wherein information used for proxy authentication and information corresponding to the second authentication error can be respectively set in a header of a request conforming to a Hypertext Transfer Protocol (HTTP), and wherein, in the conversion processing for a request to be transmitted to the destination corresponding to server in a case where the first authentication error is received from the proxy server, the authentication information is not added as information corresponding to the second authentication error but the authentication information is added as information to be used for proxy authentication.

14. The control method according to claim 10, wherein the server is a print server.

15. The control method according to claim 14, wherein the system in the information processing apparatus is a spooler system.

16. The control method according to claim 15, wherein the first request which has been transmitted to the destination corresponding to the server is based on a request received from the spooler system via a standard port monitor of the OS.

17. The control method according to claim 15, wherein a request received from the system is at least one of a printer information acquisition request and a request for a printing instruction to the server.

18. The control method according to claim 10, wherein, in communication with the server, the agent module performs at least one of communication band limit control, data compression transmission, and recovery.

19. A non-transitory computer readable storage medium on which is stored a computer program to perform a control method for an information processing apparatus on which an operating system (OS) operates, wherein the information processing apparatus includes a memory storing instructions related to an agent module for controlling communication between an external server on a network and a system in the information processing apparatus, and a processor which is capable of executing the instructions, the control method comprising:

receiving a first authentication error via the network from a proxy server as an intermediary in communication to the server from the information processing apparatus after a transmission of a first request to a destination corresponding to the server, wherein the first authentication error indicates that proxy authentication is required;

notifying the system in the information processing apparatus of a second authentication error indicating that authentication different from the proxy authentication is required, without notifying of the first authentication error;

receiving a request including authentication information corresponding to the second authentication error from the system in the information processing apparatus as a response to the second authentication error;

performing conversion processing for the received request from the system in the information processing apparatus so that a second request, in which the authentication information corresponding to the second authentication error is added as authentication information usable for the proxy authentication, is generated; and transmitting the second request generated by the conversion processing to the destination corresponding to the server.

* * * * *